United States Patent
Melvin, III et al.

(10) Patent No.: US 7,491,479 B2
(45) Date of Patent: Feb. 17, 2009

(54) COMPENSATING FOR EFFECTS OF TOPOGRAPHY VARIATION BY USING A VARIABLE INTENSITY-THRESHOLD

(75) Inventors: Lawrence S. Melvin, III, Hillsboro, OR (US); Jensheng Huang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 565 days.

(21) Appl. No.: 11/254,124

(22) Filed: Oct. 7, 2005

(65) Prior Publication Data

US 2007/0082281 A1    Apr. 12, 2007

(51) Int. Cl.
*G03F 9/00*    (2006.01)
(52) U.S. Cl. .............................. 430/30; 430/5; 430/396; 716/19
(58) Field of Classification Search ...................... 430/5, 430/30, 396; 716/19
See application file for complete search history.

(56) References Cited

U.S. PATENT DOCUMENTS

2004/0058255 A1 * 3/2004 Jessen et al. .................. 430/30

* cited by examiner

*Primary Examiner*—Christopher G Young
(74) *Attorney, Agent, or Firm*—Park, Vaughan & Fleming LLP (57) ABSTRACT

One embodiment of the present invention provides a system that accurately determines a critical dimension of a feature in a layout by compensating for the effects of topography variation on the performance of an optical lithography process. During operation, the system first receives a layout. Next, the system computes and aerial-image intensity at an evaluation point in the layout using and optical lithography model that models the optical lithography process. Note that the aerial-image intensity is typically compared with a constant intensity threshold to determine a critical dimension of a feature in the layout. The system then computes an intensity threshold based on features in the proximity of the evaluation point, which compensates for the effects of topography variations on the performance of the optical lithography process. Next, the system determines the critical dimension of the feature by comparing the aerial-image intensity with the computed intensity threshold, instead of comparing the aerial-image intensity with the constant intensity threshold.

20 Claims, 6 Drawing Sheets

COMPENSATING FOR EFFECTS OF TOPOGRAPHY VARIATION BY USING A VARIABLE INTENSITY-THRESHOLD

BACKGROUND

1. Field of the Invention

The present invention relates to integrated circuit fabrication. More specifically, the present invention relates to a method and apparatus for compensating for effects of topography variation by using a variable intensity-threshold during an OPC process.

2. Related Art

Dramatic improvements in semiconductor integration circuit (IC) technology presently make it possible to integrate tens of millions of transistors, onto a single semiconductor IC chip. These improvements in integration densities have been achieved through corresponding improvements in semiconductor manufacturing technologies. In particular, advances in optical lithography technology have been driving IC chip feature sizes into deep-submicron ranges, with the help of Optical Proximity Correction (OPC) techniques.

Semiconductor manufacturing technologies typically include a number of processes which involve complex physical and chemical interactions. Since it is almost impossible to perfectly control these complex physical and chemical interactions, these processes typically have process variations that can cause the characteristics of the actual integrated circuit to be different from the desired characteristics. However, if a process variation is predictable and systematic, OPC techniques can be used to model this process variation and compensate for it by modifying the layout.

One such process variation relates to topography variation on a wafer surface, which can cause defocusing during an optical lithography process. During the optical lithography process, the optical exposure system and the wafer surface are configured so that the focal plane of the optical exposure system coincides with the surface of the wafer on which an in-focus aerial-image of the layout is desired to be printed. Topography variation on the wafer surface can cause portions of the wafer's surface to be above or below the focal place, which can result in the aerial-image to become defocused.

Generally, an optical exposure system can operate over a range of focus variation called "usable depth of focus" (UDOF), which is the amount of focus variation that can be tolerated while maintaining an acceptable lithography quality. UDOF is typically a function of both wavelength and numerical aperture (NA). However, as the wavelength continues to decrease and NA continues to increase, UDOF correspondingly decreases, making the lithography process more sensitive to the defocus caused by topography variations.

During exposure, an image of the layout is formed on photoresist coated on the wafer surface. The exposure creates different intensity profiles on the wafer's surface. Each type of photoresist has a certain intensity threshold, which is the amount of energy required to print features using the photoresist. The defocus caused by topography variation can cause the image intensity at a point on the wafer to be different from the image intensity that is expected under in-focus conditions. This can cause variations in the critical dimension (CD) of the printed patterns.

Unfortunately, current OPC techniques do not provide mechanisms to correct for such topography variations. As a result, the associated CD variations are carried to the downstream processes and eventually decrease the yield and performance of IC chips that are manufactured without correcting for such topography variations. Additionally, the CD variations due to topography variation can increase CD variations due to other process variations.

Specifically, during the optical lithography process, a process margin allows the printed features to vary within a tolerance around the design value. Even though the topography variation is not the only contributor to the lithography process margin, it has become an increasingly significant contributor due to shrinking UDOF. If the error introduced by topography variation can be corrected, designers and manufactures can have more process margin to cope with other types of process variations.

Hence, what is needed is a method and an apparatus to compensate for the effects of topography variations on the performance of semiconductor manufacturing processes without the above-described problems.

SUMMARY

One embodiment of the present invention provides a system that accurately determines a critical dimension of a feature in a layout by compensating for the effects of topography variation on the performance of an optical lithography process. During operation, the system first receives a layout. Next, the system computes an aerial-image intensity at an evaluation point in the layout using an optical lithography model that models the optical lithography process. Note that the aerial-image intensity is typically compared with a constant intensity threshold to determine a critical dimension of a feature in the layout. The system then computes an intensity threshold based on features in the proximity of the evaluation point, which compensates for the effects of topography variations on the performance of the optical lithography process. Next, the system determines the critical dimension of the feature by comparing the aerial-image intensity with the computed intensity threshold, instead of comparing the aerial-image intensity with the constant intensity threshold.

In a variation on this embodiment, the system computes the aerial-image intensity by convolving the optical lithography model with the layout.

In a variation on this embodiment, the system computes the intensity threshold by: computing an area of n-type features, an area of p-type features, and an area of field oxide features within a sampling region in the proximity of the evaluation point; and computing the intensity threshold using a statistical model that is fitted to process data, the area of n-type features, the area of p-type features, and the area of field oxide features.

In a further variation on this embodiment, the system fits the statistical model to process data by: receiving a test layout; obtaining process data by measuring a critical dimension of a test feature in the test layout after applying the optical lithography process to the test layout; computing an aerial-image intensity at an evaluation point in the test layout using the optical lithography model; computing an area of n-type features, an area of p-type features, and an area of field oxide features within a sampling region in the proximity of the evaluation point; and fitting the statistical model using the area of n-type features, the area of p-type features, the area of field oxide features, the aerial-image intensity, and the process data.

In a variation on this embodiment, the system performs the method during an optical proximity correction (OPC) process.

Another embodiment of the present invention provides a system that accurately determines a critical dimension of a feature in a layout by compensating for the effects of topography variation on the performance of one or more semiconductor manufacturing processes. During operation, the system first receives a layout. Next, the system computes a process indicator at an evaluation point in the layout using a process model that models the one or more semiconductor manufacturing processes. Note, the system can compute the process indicator by convolving the process model with the layout. Furthermore note that the process indicator is typically compared with a constant threshold to determine a critical dimension of a feature in the layout. The system then computes a threshold based on features in the proximity of the evaluation point, which compensates for the effects of topography variations on the performance of the one or more semiconductor manufacturing processes. Next, the system determines the critical dimension of the feature by comparing the process indicator with the computed threshold, instead of comparing the process indicator with the constant threshold.

DETAILED DESCRIPTION

Integrated Circuit Design Flow

Figure 1:
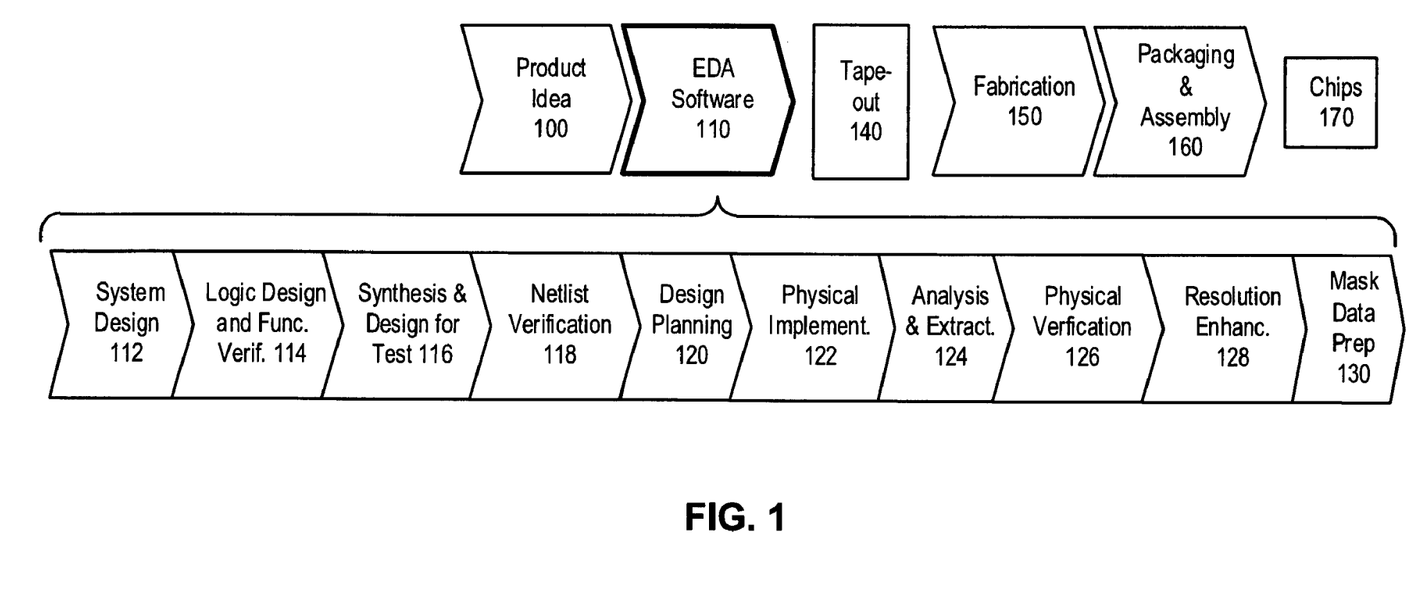
FIG. 1 illustrates various steps in the design and fabrication of an integrated circuit in accordance with an embodiment of the present invention.

FIG. 1 illustrates an exemplary integrated circuit design flow in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. Specifically, this description is not meant to limit the present invention. For example, an actual integrated circuit design may require the designer to perform the design steps in a different sequence than the sequence described below. The following text provides a brief description of the steps in the design process (step 110).

System design (step 112): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and Design Ware® products.

Logic design and functional verification (step 114): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, Design Ware®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and Design Ware® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks for lithographic use to produce finished chips. Exemplary EDA software products from Synopsys, Inc. that can be used at this step include the CATS(R) family of products.

Note that embodiments of the present invention can be used during one or more of the above described steps. Specifically, one embodiment of the present invention can be used during the resolution enhancement step 128.

Effect of Topography Variation on a Critical Dimension

Figure 2A:
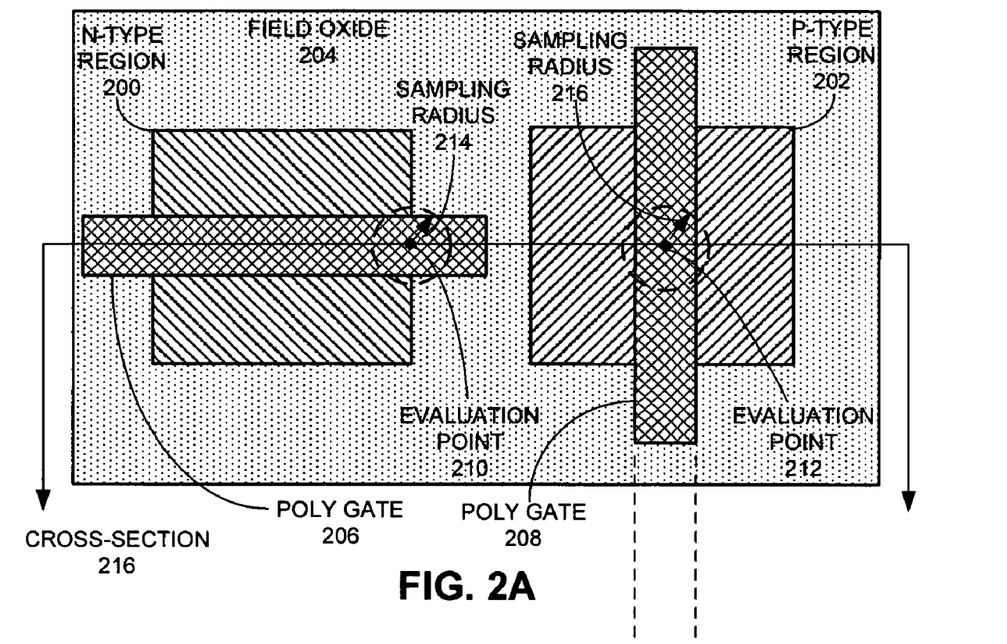
FIG. 2A illustrates a planar view of a section of a CMOS circuit layout comprising an n-type semiconductor region and a p-type semiconductor region, which are isolated by a field oxide region in accordance with an embodiment of the present invention.
Figure 2B:
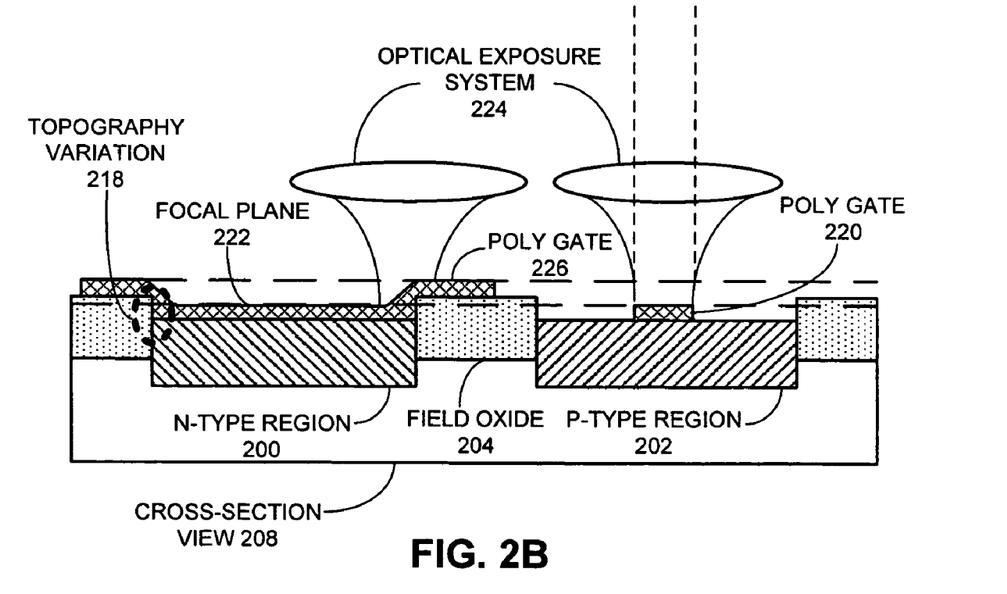
FIG. 2B illustrates a cross-sectional view of the circuit layout in FIG. 2A in accordance with an embodiment of the present invention.

FIG. 2 illustrates how topography variation on a wafer causes defocus during optical lithography process in accordance with an embodiment of the present invention.

FIG. 2A illustrates a planar view of a section of a CMOS circuit layout comprising n-type semiconductor region 200 and p-type semiconductor region 202, which are isolated by field oxide region 204 in accordance with an embodiment of the present invention.

In one embodiment of the present invention, polysilicon (poly) gate regions 206, 208 have been patterned over regions 200 and 202, respectively. Note that both gate regions extend across the boundaries between the semiconductor regions and oxide region 204. Further note, typically gate regions 206 and 208 would be patterned in the same orientation. However, the configuration of the two gate regions in FIG. 2A is used for the convenience of the discussion below.

In one embodiment, two evaluation points 210 and 212 with sampling radii 214, and 216 are in the gate regions 206 and 208 respectively. During an OPC process, process data is collected within the proximity of the evaluation points defined by the sample radii. Note that evaluation point 210 has a sampling area that contains both n-type region 200 and oxide region 204, while evaluation point 212 has a sampling area that contains only p-type region 202. Further note, typically an evaluation point for an OPC process is on an edge of a pattern, for example, evaluation point 210. However, evaluation point 212 which is in the center of p-type region 202 is used for the convenience of comparison with evaluation point 210.

FIG. 2B illustrates a cross-sectional view of the circuit layout in FIG. 2A along the cross-section 216. Note that both n-type region 200 and p-type region 202 are below the surface of field oxide 204, resulting in topography variation 218. Topography variation 218 can be determined from specific semiconductor manufacturing process.

In one embodiment, poly gate 220 has a cross-section area within p-type region 202, and the surface of gate 220 coincides with the focal plane 222 of the optical exposure system 224. Hence, the critical dimension (CD) of gate 220 at the evaluation point 212 is not affected by topography variation 218.

In one embodiment, poly gate 226 has a cross-section area extended over both regions 200 and 204, and because of this, the gate region 226 within the n-type region 200 is in focus while the gate region 226 over oxide region 204 is out of focus. Particularly, sampling area around the evaluation point 210 comprises both n-type region 200 which is in-focus and oxide region 204 which is out-of-focus. Hence, at the evaluation point 210 CD errors can occur due to the topography variation 218.

Using an Intensity Threshold to Determine a Critical Dimension

Figure 3:
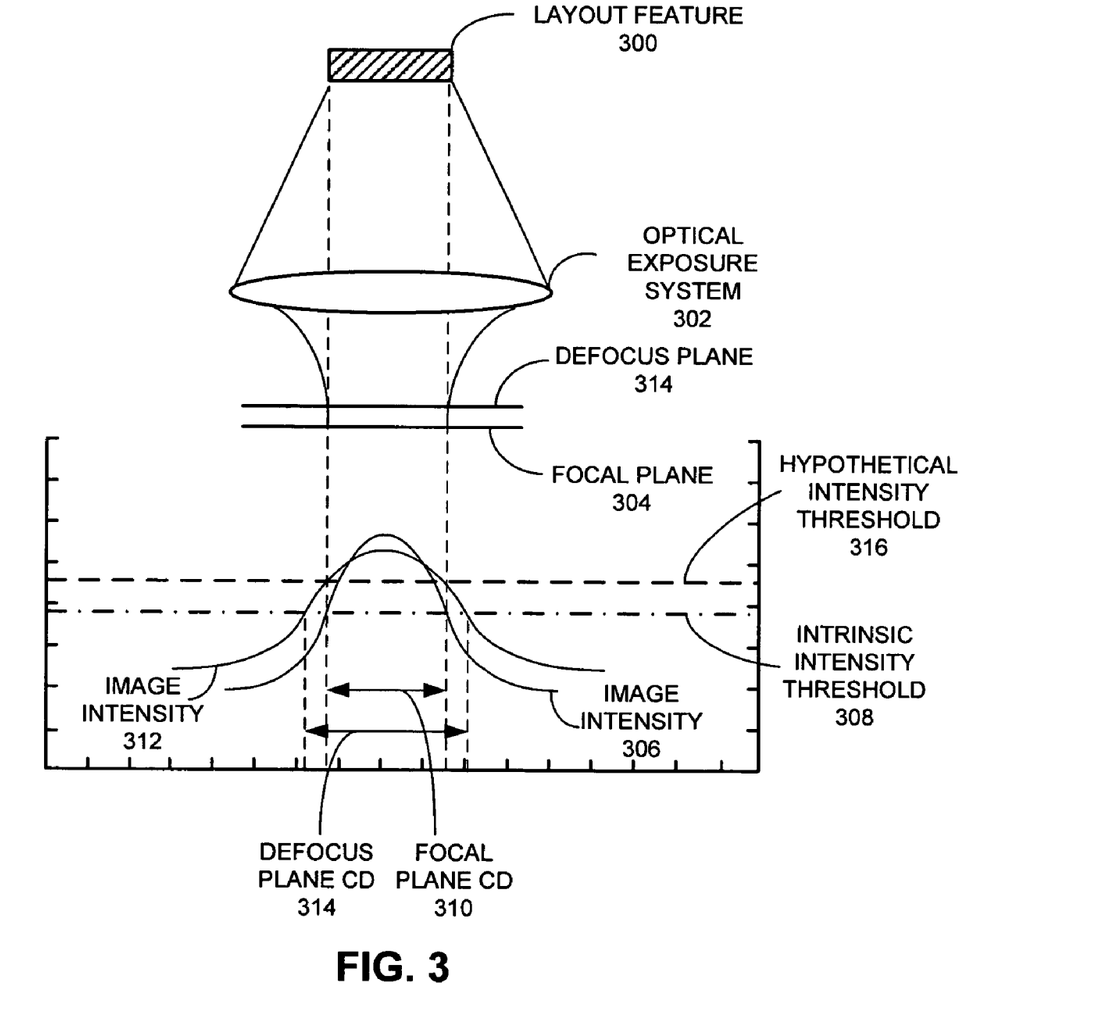
FIG. 3 illustrates how to determine a critical dimension (CD) of a feature based on an aerial-image and an intensity threshold in accordance with an embodiment of the present invention.

FIG. 3 illustrates how to determine CD of a feature based on an aerial-image and an intensity threshold in accordance with an embodiment of the present invention.

During the optical lithography process, layout feature 300 is projected by optical exposure system 302 to form an aerial-image of feature 300 on a photoresist. The aerial-image intensity can be typically computed by convolving the layout 300 with a process model that represents system 302. At focal plane 304 of system 302, aerial-image intensity 306 can be illustrated as a function of the linear position along feature 300. CD 310 of feature 300 printed in the photoresist is determined by image intensity 306 and intrinsic intensity threshold value 308. The intensity threshold is typically a constant value for certain type of photoresist due to its intrinsic chemical property.

Note that, if an aerial-image intensity of a feature and its corresponding CD are available, one can inversely obtain the intensity threshold as illustrated in FIG. 3.

Due to topography variation on a wafer, a layout feature may be printed at a defocus plane in the photoresist. In one embodiment, image intensity 312 is received at defocus plane 314 which is slightly above the focal plane 304. Image intensity 312 typically has lower peak intensity value and broader profile than those of image intensity 306 due to less focused optical power. CD 314 of feature 300 on defocus plane 314 is determined by the same intensity threshold 308, which is wider and less accurate than CD 310 determined on the focal plane of system 302.

Hypothetically, if the intensity threshold can be tuned to a new threshold 316, one can get a CD that is exactly as the designed linewidth on the defocus plane 314, without changing the corresponding intensity profile 312. This is achievable by using a variable intensity threshold in OPC model described below.

Modeling the Intensity Threshold

Figure 4:
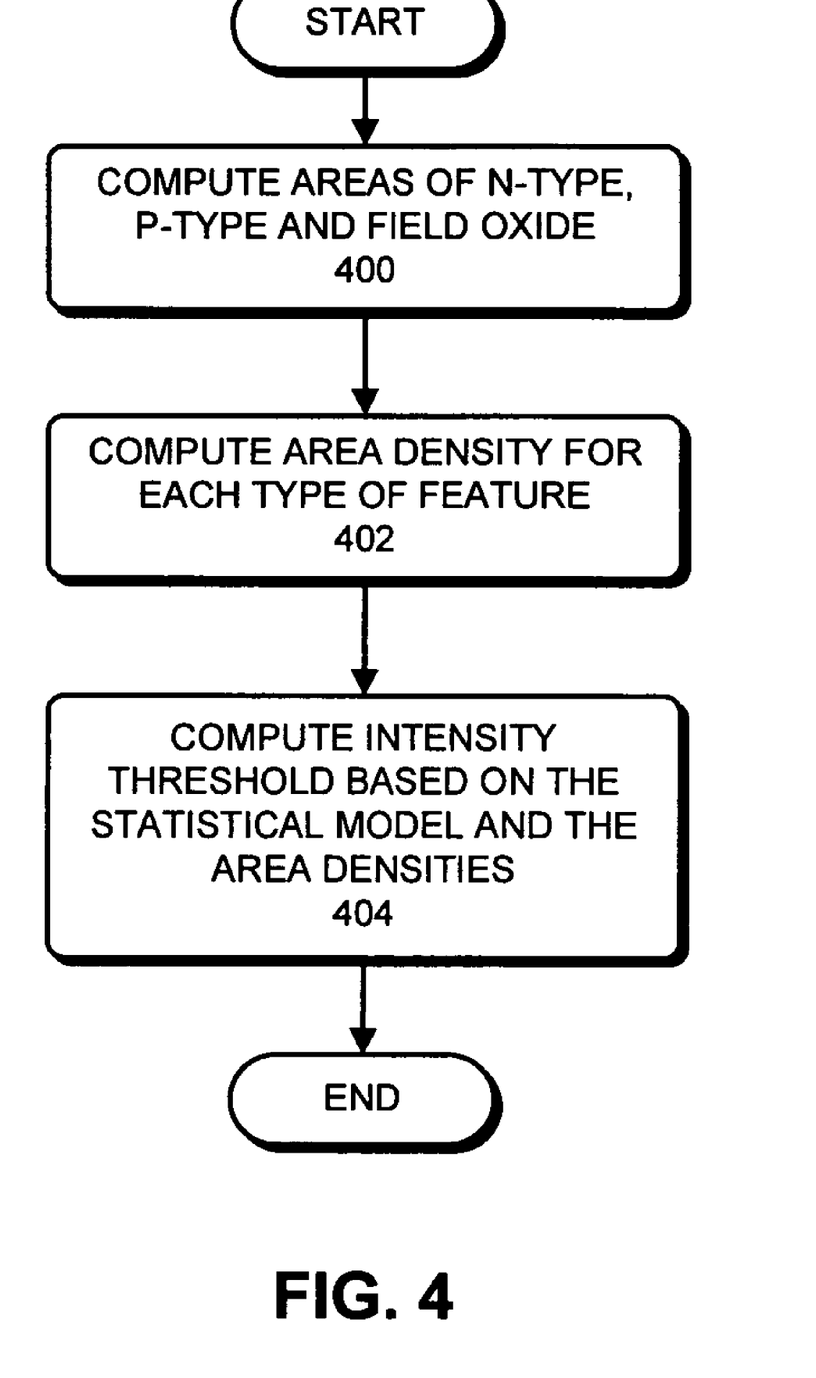
FIG. 4 presents a flowchart illustrating a process of computing a variable intensity-threshold in accordance with an embodiment of the present invention.

FIG. 4 presents a flowchart illustrating the process of computing a variable intensity threshold in accordance with an embodiment of the present invention.

Instead of using a constant-intensity threshold in the process model, the process constructs a variable intensity-threshold computed based on the area densities of n-type, p-type and field oxide regions in the proximity of the evaluation point in the layout. In doing so, the process model takes into account the process variations induced by the different regions of the layout in the sampling region. Specifically, the process model takes into account the topography variations by using the variable intensity-threshold.

During operation, the process first computes an area for n-type features, an area for p-type features, and an area for oxide within a sampling region in the proximity of the evaluation point (step 400).

Next, the process computes an area density for each type of feature by dividing the areas of n-type, p-type or field by the total area of the sampling region (step 402). Note, the density computation can be performed once the design layout is known.

The process then computes the variable intensity threshold in the proximity of the evaluation point using a statistical model and the computed area densities of n-type features, p-type features, and oxide features (step 404). Note, prior to using the statistical model, the statistical model is fitted to process data which allows the computed intensity threshold to compensate for the effects of topography variations on the performance of one or more semiconductor manufacturing processes.

In other words, the process of computing an variable intensity threshold based on the layout features takes into account all process variations introduced by the n-type, p-type and oxide layout features, which can include but is not limited to the topography variation.

Figure 5:
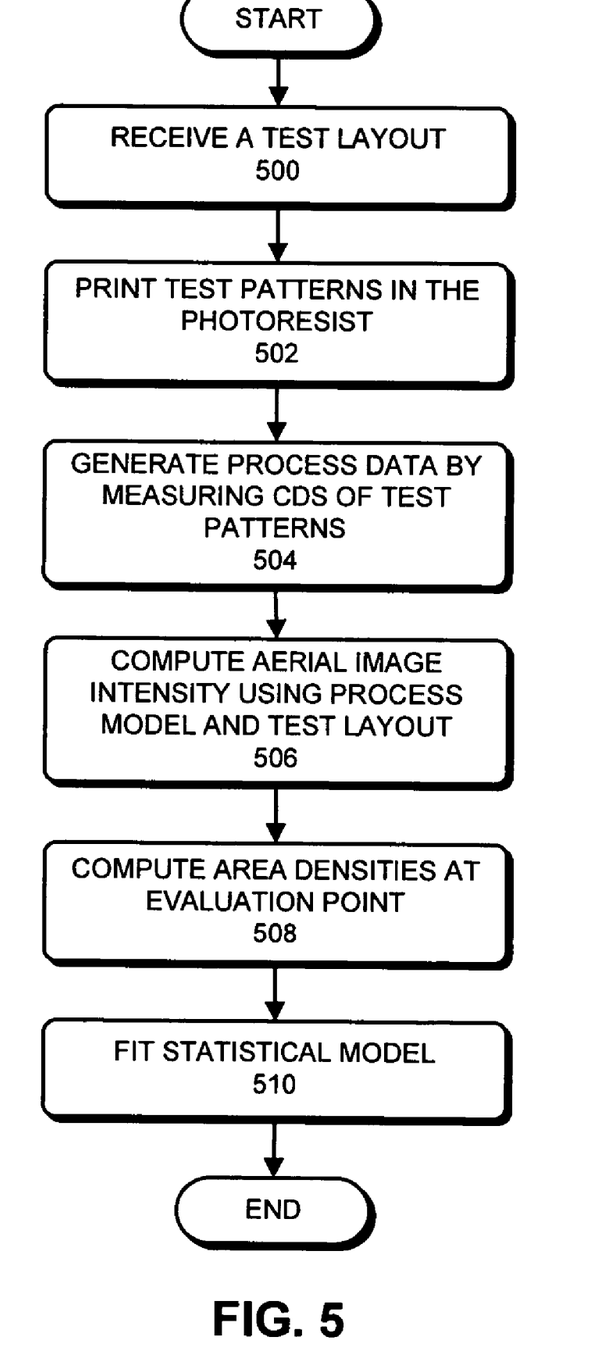
FIG. 5 presents a flowchart illustrating a process of generating a statistical model for a variable intensity-threshold in accordance with an embodiment of the present invention.

FIG. 5 presents a flowchart illustrating the process of generating the statistical model for the variable intensity threshold in accordance with an embodiment of the present invention.

The process first receives a test layout which contains different test patterns (step 500). Next, the process prints the test patterns into photoresist on a wafer by applying the optical lithography process (step 502). The process then generates process data by measuring CDs of the known test patterns in the photoresist at a plurality of evaluation points (step 504).

Next, the process computes an aerial-image intensity at an evaluation point on a test pattern in the test layout using the process model for the optical lithography process and the test layout (step 506). The process then computes the area densities of n-type features, p-type features and oxide features within a sampling region in the proximity of the evaluation point (step 508).

Finally, the process fits the statistical model using the densities of n-type features, p-type features, and oxide features, the aerial-image intensity, and the measured CDs of the known patterns (step 510). Specifically, the measured CDs of the known patterns and the corresponding aerial-image intensities are used to derive intensity thresholds at the evaluation points, which are subsequently used to fit to the densities values to obtain the statistical model.

In one embodiment of the present invention, the process fits a statistical model by deriving a set of coefficients for a linear relationship between the intensity threshold and area densities, which can be expressed by the follow equation:

$$\text{Threshold} = A_n \rho_n + A_p \rho_p + A_f \rho_f$$

where $\rho_n$, $\rho_p$, and $\rho_f$ are the densities of n-type, p-type and field oxide respectively, while $A_n$, $A_p$, and $A_f$ are the set of coefficients representing the statistical model. Note that $\rho_n + \rho_p + \rho_f = 1$ in the case of only three types of features. It should be apparent to one with ordinary skill in the art that higher-order fitting can be used to fit the statistical model.

Using the intensity threshold statistical model with the derived fitting coefficients, the process can now compute a variable intensity-threshold at an evaluation point in the layout based on the area densities of the n-type, p-type and field oxide computed within the sampling region in the proximity of the evaluation point (step 404), which is then used in an OPC model.

Compensating for Topography Variation

Figure 6:
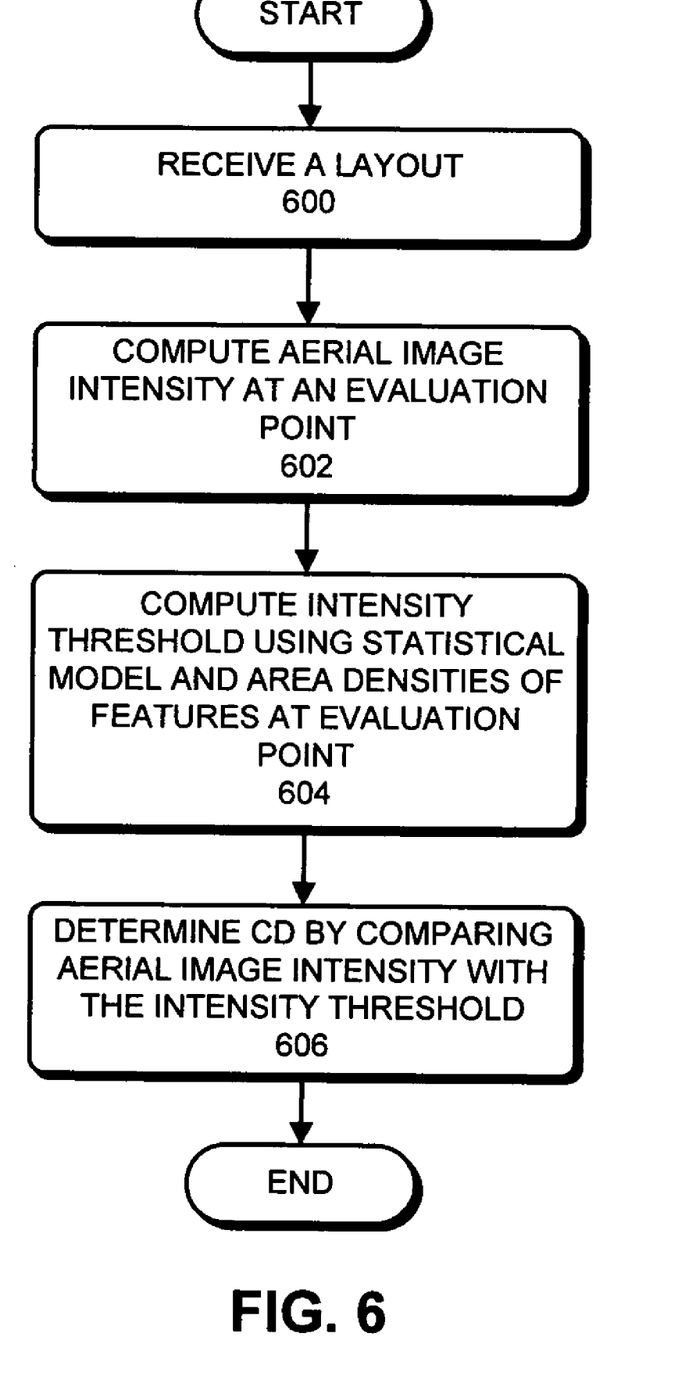
FIG. 6 presents a flowchart illustrating a process of accurately determining a CD of a feature by compensating for the efforts of topography variation using a variable intensity threshold in accordance with an embodiment of the present invention.

FIG. 6 presents a flowchart illustrating the process of accurately determining CD of a feature by compensating for the effects of topography variation using a variable intensity threshold in accordance with an embodiment of the present invention.

During operation, the process first receives the layout (step 600). Next, the process computes aerial-image intensity at an evaluation point in the layout using a process model that models the optical lithography process, wherein the aerial-image intensity is typically compared with a constant intensity threshold to determine a critical dimension of a feature in the layout (step 602). In one embodiment, the process computes the aerial-image intensity by convolving the optical lithography model with the layout.

The process then computes an intensity threshold based on the features in the proximity of the evaluation point, wherein the features cause topography variation (step 604). In one embodiment of the present invention, the process computes the intensity threshold based on the areas of n-type, p-type and field oxide features in the proximity of the evaluation point.

Next, the process determines the CD of a layout feature at the evaluation point by comparing the computed aerial-image intensity with the computed intensity threshold (Step 606). In doing so, the process compensates for the effects of topography variations on the performance of the optical lithography process caused by the layout feature.

Note that more generally, the above process can be used to compensate for the effects of topography variation on the performance one or more semiconductor manufacturing processes, wherein the one or more semiconductor manufacturing processes may or may not include the optical lithography process. Instead of computing an aerial-image intensity, the process computes a process indicator at an evaluation point in the layout using a process model that models the one or more semiconductor manufacturing processes, wherein the process indicator is typically compared with a constant threshold to determine a critical dimension of a feature in the layout. The process then computes a threshold based on features in the proximity of the evaluation point, which compensates for the effects of topography variations on the performance of the one or more semiconductor manufacturing processes. The process then determines CD of the feature by comparing the process indicator with the computed threshold.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

What is claimed is:

1. A method for accurately determining a critical dimension of a feature in a layout by compensating for the effects of topography variation on the performance of an optical lithography process, the method comprising:
   receiving a layout;
   computing an aerial-image at an evaluation point in the layout using an optical lithography model that models the optical lithography process;
   computing an intensity threshold based on features in the proximity of the evaluation point, so that the computed intensity threshold compensates for the effects of topography variations in the proximity of the evaluation point, and wherein the computed intensity threshold varies across the layout; and
   determining the critical dimension of the feature by comparing the aerial-image intensity with the computed intensity threshold, instead of comparing the aerial-image intensity with a constant intensity threshold.

2. The method of claim 1, wherein computing the aerial-image intensity involves convolving the optical lithography model with the layout.

3. The method of claim 1, wherein computing the intensity threshold involves:
   computing an area of n-type features, an area of p-type features and an area of field oxide features within a sampling region in the proximity of the evaluation point; and computing the intensity threshold using a statistical model that is fitted to process data, the area of n-type features, the area of p-type features and the area of field oxide features.

4. The method of claim 3, wherein the statistical model is fitted to process data by:
receiving a test layout;
obtaining process data by measuring a critical dimension of a test feature in the test layout after applying the optical lithography process to the test layout;
computing a second aerial-image intensity at a second evaluation point in the test layout using the optical lithography model;
computing a second area of n-type features, a second area of p-type features and a second area of field oxide features within a second sampling region in the proximity of the second evaluation point; and
fitting the statistical model using the second area of n-type features, the second area of p-type features, the second area of field oxide features, the second aerial-image intensity, and the process data.

5. The method of claim 1, wherein the method is used during an optical proximity correction (OPC) process.

6. A computer-readable storage medium storing instructions that when executed by a computer cause the computer to perform a method for accurately determining a critical dimension of a feature in a layout by compensating for the effects of topography variation on the performance of an optical lithography process, the method comprising:
receiving a layout;
computing an aerial-image intensity at an evaluation point in the layout using an optical lithography model that models the optical lithography process;
computing an intensity threshold based on features in the proximity of the evaluation point, so that the computed intensity threshold compensates for the effects of topography variations in the proximity of the evaluation point, and wherein the computed intensity threshold varies across the layout; and
determining the critical dimension of the feature by comparing the aerial-image intensity with the computed intensity threshold, instead of comparing the aerial-image intensity with a constant intensity threshold.

7. The computer-readable storage medium of claim 6, wherein computing the aerial-image intensity involves convolving the optical lithography model with the layout.

8. The computer-readable storage medium of claim 6, wherein computing the intensity threshold involves:
computing an area of n-type features, an area of p-type features and an area of field oxide features within a sampling region in the proximity of the evaluation point; and
computing the intensity threshold using a statistical model that is fitted to process data, the area of n-type features, the area of p-type features and the area of field oxide features.

9. The computer-readable storage medium of claim 8, wherein the statistical model is fitted to process data by:
receiving a test layout;
obtaining process data by measuring a critical dimension of a test feature in the test layout after applying the optical lithography process to the test layout;
computing a second aerial-image intensity at a second evaluation point in the test layout using the optical lithography model;
computing a second area of n-type features, a second area of p-type features and a second area of field oxide features within a second sampling region in the proximity of the second evaluation point; and
fitting the statistical model using the second area of n-type features, the second area of p-type features, the second area of field oxide features, the second aerial-image intensity, and the process data.

10. The computer-readable storage medium of claim 6, wherein the method is used during an optical proximity correction (OPC) process.

11. A method for accurately determining a critical dimension of a feature in a layout by compensating for the effects of topography variation on the performance of one or more semiconductor manufacturing processes, the method comprising:
receiving a layout;
computing a process indicator at an evaluation point in the layout using a process model that models the one or more semiconductor manufacturing processes;
computing an intensity threshold based on features in the proximity of the evaluation point, so that the computed intensity threshold compensates for the effects of topography variations in the proximity of the evaluation point, and wherein the computed intensity threshold varies across the layout; and
determining the critical dimension of the feature by comparing the process indicator with the computed intensity threshold, instead of comparing the process indicator with a constant intensity threshold.

12. The method of claim 11, wherein computing the process indicator involves convolving the process model with the layout.

13. The method of claim 11, wherein computing the intensity threshold involves:
computing an area of n-type features, an area of p-type features and an area of field oxide features within a sampling region in the proximity of the evaluation point; and
computing the intensity threshold using a statistical model that is fitted to process data, the area of n-type features, the area of p-type features and the area of field oxide features.

14. The method of claim 13, wherein the statistical model is fitted to process data by:
receiving a test layout;
obtaining process data by measuring a critical dimension of a test feature in the test layout after applying the one or more semiconductor manufacturing processes to the test layout;
computing a second process indicator at a second evaluation point in the test layout using the process model;
computing a second area of n-type features, a second area of p-type features and a second area of field oxide features within a second sampling region in the proximity of the second evaluation point; and
fitting the statistical model using the second area of n-type features, the second area of p-type features, the second area of field oxide features, the second process indicator, and the process data.

15. The method of claim 11, wherein the method is used during an optical proximity correction (OPC) process.

16. A computer-readable storage medium storing instructions that when executed by a computer cause the computer to perform a method for accurately determining a critical dimension of a feature in a layout by compensating for the effects of topography variation on the performance of one or more semiconductor manufacturing processes, the method comprising:

receiving a layout;

computing a process indicator at an evaluation point in the layout using a process model that models the one or more semiconductor manufacturing processes;

computing an intensity threshold based on features in the proximity of the evaluation point, so that the computed intensity threshold compensates for the effects of topography variations in the proximity of the evaluation point, and wherein the computed intensity threshold varies across the layout; and determining the critical dimension of the feature by comparing the process indicator with the computed intensity threshold instead of comparing the process indicator with a constant intensity threshold.

17. The computer-readable storage medium of claim 16, wherein computing the process indicator involves convolving the process model with the layout.

18. The computer-readable storage medium of claim 16, wherein computing the intensity threshold involves:

computing an area of n-type features, an area of p-type features and an area of field oxide features within a sampling region in the proximity of the evaluation point; and computing the intensity threshold using a statistical model that is fitted to process data, the area of n-type features, the area of p-type features and the area of field oxide features.

19. The computer-readable storage medium of claim 18, wherein the statistical model is fitted to process data by:

receiving a test layout;

obtaining process data by measuring a critical dimension of a test feature in the test layout after applying the one or more semiconductor manufacturing processes to the test layout;

computing a second process indicator at a second evaluation point in the test layout using the process model;

computing a second area of n-type features, a second area of p-type features and a second area of field oxide features within a second sampling region in the proximity of the second evaluation point; and fitting the statistical model using the second area of n-type features, the second area of p-type features, the second area of field oxide features, the second process indicator, and the process data.

20. The computer-readable storage medium of claim 16, wherein the method is used during an optical proximity correction (OPC) process.

* * * * *

UNITED STATES PATENT AND TRADEMARK OFFICE
CERTIFICATE OF CORRECTION

PATENT NO. : 7,491,479 B2 Page 1 of 1
APPLICATION NO. : 11/254124
DATED : February 17, 2009
INVENTOR(S) : Lawrence S. Melvin, III et al.

It is certified that error appears in the above-identified patent and that said Letters Patent is hereby corrected as shown below:

In claim 1 (at column 8, line 46), please add the word "intensity" after the words "aerial-image" so that the line reads: --computing an aerial-image intensity at an evaluation point in the--.

Signed and Sealed this

Twenty-third Day of February, 2010

David J. Kappos
*Director of the United States Patent and Trademark Office*